United States Patent
Kaminsky et al.

(10) Patent No.: US 7,046,439 B2
(45) Date of Patent: May 16, 2006

(54) OPTICAL ELEMENT WITH NANOPARTICLES

(75) Inventors: Cheryl J. Kaminsky, Webster, NY (US); Robert P. Bourdelais, Pittsford, NY (US); Glen C. Irvin, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 146 days.

(21) Appl. No.: 10/443,387

(22) Filed: May 22, 2003

(65) Prior Publication Data

US 2004/0233526 A1 Nov. 25, 2004

(51) Int. Cl.
*G03B 21/60* (2006.01)

(52) U.S. Cl. .................. 359/452; 359/459; 524/433
(58) Field of Classification Search .............. 524/433; 359/452, 459
See application file for complete search history.

(56) References Cited

U.S. PATENT DOCUMENTS

| | | | |
|---|---|---|---|
| 4,632,869 A | 12/1986 | Park et al. | |
| 5,302,574 A | 4/1994 | Lawrence et al. | |
| 5,716,679 A | 2/1998 | Krug et al. | |
| 6,329,058 B1 * | 12/2001 | Arney et al. | 428/403 |
| 6,498,208 B1 * | 12/2002 | Border et al. | 524/433 |
| 2002/0123589 A1 | 9/2002 | Olson et al. | |

FOREIGN PATENT DOCUMENTS

| | | |
|---|---|---|
| EP | 1 217 393 | 6/2002 |
| EP | 1 447 785 | 8/2004 |
| GB | 1 404 575 | 9/1975 |
| WO | 02/088784 | 11/2002 |
| WO | 03/038787 | 5/2003 |

OTHER PUBLICATIONS

C. J. Kaminsky et al, "Optical Element Containing Nanocomposite Materials", U.S. Appl. No. 10/266,181, (D–84471) filed Oct. 7, 2002.

* cited by examiner

*Primary Examiner*—Ling-Siu Choi
(74) *Attorney, Agent, or Firm*—Arthur E. Kluegel

(57) ABSTRACT

Disclosed is an optical element comprising a substrate with surface features on a surface thereof having an Ra of from 3 to 200 micrometers containing a dispersion of minute particles having a particle size dimension less than 100 nanometers.

34 Claims, No Drawings

OPTICAL ELEMENT WITH NANOPARTICLES

FIELD OF THE INVENTION

The invention relates to a light management film. In a preferred form, the invention relates to a light management film containing a dispersion of minute particles for use in a backlit display application.

BACKGROUND OF THE INVENTION

Optical materials and optical products are useful to control the flow and intensity of light. Examples of useful optical products include optical lenses such as Fresnel lenses, optical light fibers, light tubes, optical films including totally internal reflecting films, retroreflective sheeting, and microreplicated products such as brightness enhancing films (BEF) and security products. Brightness enhancement films are very useful in many of today's electronic products to increase the brightness of backlit flat panel displays such as liquid crystal displays (LCDs), electroluminescent panels, laptop computer displays, word processors, desktop monitors, televisions, video cameras, and automotive and avionic displays, among others.

With respect specifically to brightness enhancement films, the index of refraction of the material composing the surface features is related to the brightness gain produced by the brightness enhancement film. Gain is a measure of the improvement in brightness of a display due to the brightness enhancement film and is a property of the optical material, and also of the geometry of the brightness enhancement film. A high gain is desired for a brightness enhancement film because improved gain provides an effective increase in the brightness of a backlit display.

Improved brightness means that the electronic product can operate more efficiently by using less power to light the display. Reduced power consumption translates into reduced heat generation and therefore means increased component life. Thus, because of these advantages, there exists a continuing need to find optical products exhibiting improved index of refraction values in the optical features.

Optical products can be prepared from high index of refraction materials, including monomers such as high index of refraction (meth)acrylate monomers, halogenated monomers, and other such high index of refraction monomers as are known in the art.

U.S. published application 2002/0123589 (Olson et al.) discloses a high index of refraction polymerizable composition for use in optical films. While this does deliver a high index of refraction optical element, UV curing is limited in size and properties of surface features it can produce. UV curing is limited in the depth or height of the feature it can produce, limiting its usefulness in some optical applications. Furthermore, UV curing cannot use the range of polymers and therefore polymer properties (such as modulus, scratch resistance) that other processes can, such as thermoplastic casting and embossing.

Polymers may be used in optical films with refractive indices less than that required for certain optical applications if modified by partial substitution of atoms, such as bromide or sulfur, for hydrogen or oxygen in the polymers. Such substituted polymers typically have increased refractive indexes but are often undesirably colored and lack thermal and photochemical stability. Therefore, these substituted polymers may not be the best choice for certain optical applications.

An alternative method of increasing the refractive indexes of polymers is combining nanoparticles with polymers. The refractive indexes of polymer/nanoparticle blends are, in part, dependent upon the refractive indices of the nanoparticles added to the polymer matrix. The theoretical refractive index of a polymer/nanoparticle blend is the volume weighted average of the refractive indexes of the nanoparticles and the polymer matrix. Consequently, it is desirable to make blends using metal oxide particles having high refractive indexes. However, metal oxide particles that are formed in water are difficult to transfer into organic liquids without particle agglomeration and concomitant transfer of water.

U.S. Pat. No. 6,329,058 (Arney et al.) discloses nanosized metal oxide particles in a polymer matrix to form transparent blends and a method for making them. While the patent claims that the polymer of the metal oxide/polymer blend is any curable material, the examples and patent teach to the use of UV curable polymers and not thermoplastic materials. The preparation of nano-particle/polymer blends in a UV curable system is different than a thermoplastic system. The dispersants taught in the patent would most likely degrade at the temperatures used in thermoplastic extruding causing agglomeration of the nanoparticles and decomposition of the dispersants. Furthermore, the nanoparticles taught in the patent were produced in solvent systems, and then dispersed into UV chemistry and crosslinked to form the blend. Thermoplastic extrusion requires dry polymer and therefore the nanoparticles would have to be dried and re-dispersed in a molten polymer, very different than the process taught by '058. While the patent discloses the metal oxide/polymer blend in surface structures, the preferred range of $\frac{1}{10}^{th}$ to 10 millimeters is an order of magnitude larger than the desired range for an optical film with surface features of the present invention.

PROBLEM TO BE SOLVED BY THE INVENTION

There remains a need for an improved light management film to provide improved efficiency light shaping characteristics for backlit displays.

SUMMARY OF THE INVENTION

The invention provides an optical element comprising a substrate with surface features on a surface thereof having an Ra of from 3 to 200 micrometers containing a dispersion of minute particles having a particle size dimension less than 100 nanometers.

ADVANTAGEOUS EFFECT OF THE INVENTION

The invention provides improved light management media to shape light more efficiently providing brighter backlit displays.

DETAILED DESCRIPTION OF THE INVENTION

The invention has numerous advantages over prior practices in the art. Because nanoparticles can be expensive, having the nano-particle/polymer blend in the surface features instead of the entire bulk of the optical element saves money while delivering the same optical result.

Thermoplastics as part of the nano-particle/polymer blend enable a wide variety of physical and optical properties for the optical element and are easily manufacturable. For example, polyethylene could be used as a transparent, low glass transition temperature resin for forming optical features that are soft so that they do not scratch other films. Thermoplastics have a much wider range of physical and optical properties than UV cured polymers enabling their use in a wide variety of applications.

The nanoparticles can change the index of refraction of the polymer blend so that the optical element has more utility. The nanoparticles/thermoplastic polymer blends also have increased mechanical features, such as increased modulus, scratch resistance, and hardness. The nanoparticles also affect the melting and glass transition temperatures, which can increase the polymer melt processing conditions. Recent work has found that nanoparticles doped into a matrix where there is not a good interface between particles & matrix can give varying properties i.e. differing mechanical properties, decrease in Tg etc. The nanoparticles also increase the printability of the optical element. Adding strength and stiffness to the light management film is important for transport through a printing system and handling. In small addition quantities, the addition of nanoparticles to thermoplastic resins does not affect the transmission or light shaping characteristics significantly because the particles are below the wavelength of light and therefore do not scatter light. These and other advantages will be apparent from the detailed description below.

The term "surface feature" means any structure that directs light as it passes through or reflects off of it. For example, a prism structure that collimates light or a diffuser that directs light out in a random direction comprises light shaping elements. The light directing or deflection can be at the micro or macro level. "Roughness average" or Ra means the average peak to valley measurement of the light shaping elements. "particle size dimension less than 100 nanometers" means any particle that has at least one dimension less than 100 nanometers. Particles that fit this description are called "nanoparticles". This means that carbon nanotubes that have a diameter of 1–10 nm but a length of 100 nanometers to 50 micrometers would be considered "nanoparticles" because they have at least one dimension less than 100 nanometers.

The term "LCD" means any rear projection display device that utilizes liquid crystals to form the image. The term "diffuser" means any material that is able to diffuse specular light (light with a primary direction) to a diffuse light (light with random light direction). The term "light diffusion elements" means any element that is able to diffuse specular light (light with a primary direction) to a diffuse light (light with random light direction). The term "light" means visible light. The term "total light transmission" means percentage light transmitted through the sample at 500 nm as compared to the total amount of light at 500 nm emitted by the light source. This includes both spectral and diffuse transmission of light. The term "haze" means the ratio of % diffuse transmitted light at 500 nm to % total transmitted light at 500 nm multiplied by a factor of 100. "Transparent" means a film with total light transmission of 80% or greater at 500 nm. The term "light shaping efficiency" means the percent of light shaped or directed compared to the amount of light that strikes the surface of the light shaping element.

The term "polymeric film" means a film comprising polymers. The term "polymer" means homo- and co-polymers. The term "average", with respect to lens size and frequency, means the arithmetic mean over the entire film surface area. The term "pattern" means any predetermined arrangement whether regular or random. The term "substantially circular" indicates a geometrical shape where the major axis is no more than two times the minor axis. An optical gradient is a change in optical properties such as transmission, reflection, and haze as a function of distance from a stating point.

In one embodiment of the invention, the diffusion film has a textured surface on at least one side, in the form of a plurality of random microlenses, or lenslets. The term "lenslet" means a small lens, but for the purposes of the present discussion, the terms lens and lenslet may be taken to be the same. The lenslets overlap to form complex lenses. "Complex lenses," means a major lens having on the surface thereof multiple minor lenses. "Major lenses" mean larger lenslets that the minor lenses are formed randomly on top of. "Minor lenses" mean lenses smaller than the major lenses that are formed on the major lenses. The term "concave" means curved like the surface of a sphere with the exterior surface of the sphere closest to the surface of the film. The term "convex" means curved like the surface of a sphere with the interior surface of the sphere closest to the surface of the film.

The divergence of light through the lens may be termed "asymmetric", which means that the divergence in the horizontal direction is different from the divergence in the vertical direction. The divergence curve is asymmetric, meaning that the direction of the peak light transmission is not along the direction $\theta=0°$, but is in a direction non-normal to the surface. "Void" is used herein to mean devoid of added solid and liquid matter, although it is likely the "voids" contain gas.

The surface features can be either integral to the substrate or in a separate layer coated onto the substrate. When the surface features are integral to the substrate the efficiency of the light shaping of the film is high because there is no index of refraction change throughout the film to cause reflections. When the surface features are coated onto the substrate, as in extrusion coating, a broader range of materials can be used. For example, an oriented polyester base could be used to give the film strength and then surface features could be coated onto the polyester base out of a different polymer filled with nano-particles. The two polymers used for the substrate and the surface features could be the same polymer or two different polymers that have matching indexes of refraction (adding nano-particles to one or more of these layers can alter the indexes of refraction). When the surface features are integral to the substrate there is less of change for delamination than the two layered (substrate and surface feature approach).

The minute particles are preferably less than 55 nanometers in particle size dimension. These particles when they are below 50 nanometers in particle size dimension do not scatter light significantly and therefore do not effect the scattering characteristics of the optical element significantly. More preferably, the minute particles have a particle size dimension of less than 15 nanometers because the particles then are sufficiently below the wavelength of visible light so that they do not cause scattering of light and can therefore be used to change the index of refraction of materials without impacting their scattering, light transmission, and light reflection characteristics significantly. This size range facilitates dispersion of the particles into the polymer matrix. Furthermore, because the particles are very small, if the particles aggregate to form clusters of 2 or 3 particles (that in turn act as one particle), the particle size dimension of the aggregated particle is still small enough not to significantly effect the transmission properties of the optical element. To utilize the small primary particle size efficiently for transparency requirements, it is necessary to have a high quality of dispersion where quality of dispersion means the degree to which agglomeration (aggregation) of primary particles exists. A high quality of dispersion will have small numbers of aggregates as well as small aggregates of primary particles, thereby making a smaller impact on transmission properties while giving the desired refractive index feature.

If the roughness average of the surface features is less than 3 micrometers then the surface features cannot shape light effectively. Preferably, the average roughness average of the surface structures is at least 5 micrometers. It has been shown that when the surface features are on average 5 micrometers or taller, the surface features are able to shape light very efficiently in a variety of geometries. Preferably, the surface features are less than 225 micrometers in surface roughness because for some applications (such as an optical film), this causes the optical element with the substrate and surface features to become very thick, adding weight and material cost to the display and optical element. More preferably, the surface features have an Ra of less than 100 micrometers for decreased weight and cost of the optical element. It has been shown that a Ra of 25 to 75 micrometers is most preferred because it has been shown that this range allows for a wide variety of surface feature geometries and optical functions.

The surface features preferably have an average aspect ratio of 0.1 to 7.0. When the aspect ratio of the surface features are less than 0.07, the amount of curvature or slope is too low to sufficiently shape light in transmission or reflection. When the aspect ratio of the diffusion elements is greater than 9.2, it becomes difficult to produce these using extrusion roll molding or other embossing techniques.

In one embodiment of the invention, the surface features are preferably complex lenses. Complex lenses are lenses on top of other lenses. They have been shown to provide very efficient diffusion of light and high transparency, enabling an efficient diffuser that also allows for brighter displays. The amount of diffusion is easily altered by changing the complexity, geometry, size, or frequency of the complex lenses to achieve the desired diffusion.

The plurality of lenses of all different sizes and shapes are formed on top of one another to create a complex lens feature resembling a cauliflower. The lenslets and complex lenses formed by the lenslets can be concave into the film or convex out of the film.

One embodiment of the present invention could be likened to the moon's cratered surface. Asteroids that hit the moon form craters apart from other craters, that overlap a piece of another crater, that form within another crater, or that engulf another crater. As more craters are carved, the surface of the moon becomes a complexity of depressions like the complexity of lenses formed in the film.

The complex lenses may differ in size, shape, off-set from optical axis, and focal length. The curvature, depth, size, spacing, materials of construction (which determines the basic refractive indices of the polymer film and the substrate), and positioning of the lenslets determine the degree of diffusion, and these parameters are established during manufacture according to the invention.

The surface of each lenslet is a locally spherical segment, which acts as a miniature lens to alter the ray path of energy passing through the lens. The shape of each lenslet is "semi-spherical" meaning that the surface of each lenslet is a sector of a sphere, but not necessarily a hemisphere. Its curved surface has a radius of curvature as measured relative to a first axis (x) parallel to the transparent polymeric film and a radius of curvature relative to second axis (y) parallel to the transparent polymeric film and orthogonal to the first axis (x). The lenses in an array film need not have equal dimensions in the x and y directions. The dimensions of the lenses, for example length in the x or y direction, are generally significantly smaller than a length or width of the film. "Height/Diameter ratio" means the ratio of the height of the complex lens to the diameter of the complex lens. "Diameter" means the largest dimension of the complex lenses in the x and y plane. The value of the height/diameter ratio is one of the main causes of the amount of light spreading, or diffusion that each complex lens creates. A small height/diameter ratio indicates that the diameter is much greater than the height of the lens creating a flatter, wider complex lens. A larger height/diameter value indicates a taller, skinner complex lens.

The result of using a diffusion film having lenses whose optical axes are offset from the center of the respective lens results in dispersing light from the film in an asymmetric manner. It will be appreciated, however, that the lens surface may be formed so that the optical axis is offset from the center of the lens in both the x and y directions.

Preferably, the concave or convex lenses have an average frequency in any direction of from 5 to 250 complex lenses/mm. When a film has an average of 285 complex lenses/mm, the width of the lenses approaches the wavelength of light. The lenses will impart a color to the light passing through the lenses and add unwanted color to the transmitted and reflected light. Having less than 4 lenses per millimeter creates lenses that are too large and therefore diffuse the light less efficiently. Concave or convex lenses with an average frequency in any direction of between 22 and 66 complex lenses/mm are more preferred. It has been shown that an average frequency of between 22 and 66 complex lenses provide efficient light diffusion and can be efficiently manufactured utilizing cast coated polymer against a randomly patterned roll.

The surface features preferably have concave or convex lenses at an average width between 3 and 60 microns in the x and y direction. When lenses have sizes below 1 micron the lenses impart a color shift in the light passing through because the lenses dimensions are on the order of the wavelength of light and add unwanted color to the transmitted or reflected light. When the lenses have an average width in the x or y direction of more than 68 microns, the lenses is too large to diffuse the light efficiently. More preferred, the concave or convex lenses at an average width between 15 and 40 microns in the x and y direction. This size lenses has been shown to create the most efficient diffusion and a high level of transmission.

The concave or convex complex lenses comprising minor lenses wherein the width in the x and y direction of the smaller lenses is preferably between 2 and 20 microns. When minor lenses have sizes below 1 micron the lenses impart a color shift in the light passing through because the lenses dimensions are on the order of the wavelength of light and add unwanted color to the light. When the minor lenses have sizes above 25 microns, the diffusion efficiency is decreased because the complexity of the lenses is reduced. More preferred are the minor lenses having a width in the x and y direction between 3 and 8 microns. This range has been shown to create the most efficient diffusion.

The number of minor lenses per major lens is preferably from 2 to 60. When a major lens has one or no minor lenses, its complexity is reduced and therefore it does not diffuse as efficiently. When a major lens has more than 70 minor lens contained on it, the width of some of the minor lens approaches the wavelength of light and imparts a color to the light transmitted. Most preferred are from 5 to 18 minor lenses per major lens. This range has been shown to produce the most efficient diffusion.

Preferably, the concave or convex lenses are semispherical meaning that the surface of each lenslet is a sector of a sphere, but not necessarily a hemisphere. This provides excellent even diffusion over the x-y plane. The semispherical shaped lenses scatter the incident light uniformly, ideal for a display application where the display area needs to be diffused uniformly.

The surface of each lenslet is a locally spherical segment, which acts as a miniature lens to alter the ray path of energy passing through the lens. The shape of each lenslet is "semi-spherical" meaning that the surface of each lenslet is a sector of a sphere, but not necessarily a hemisphere. Its curved surface has a radius of curvature as measured relative to a first axis (x) parallel to the transparent polymeric film and a radius of curvature relative to second axis (y) parallel to the transparent polymeric film and orthogonal to the first axis (x). The lenses in an array film need not have equal dimensions in the x and y directions. The dimensions of the lenses, for example length in the x or y direction, are generally significantly smaller than a length or width of the film.

The surface features being micro-grooves are preferred. Micro-grooves are any groove or channel that the width, length, or height of the groove is between 1 and 1000 micrometers. The nano-particles and polymer form the groove structure (the sides and bottom of the grooves), with the actual groove or channel not being filled. The groove or channel can be filled in a secondary operation with different chemistry with a wide variety of uses. For example, the coated material could be UV curable materials or solvent-coated materials and could be a toxin sensor to conductive materials. The nano-particles forming the sides and bottom of the grooves have utility by adding strength to the groove form, changing the index of refraction of the groove structure (for light guiding), or for enhanced mechanical and processing properties.

The surface features preferably comprise a surface diffuser. A surface diffuser utilizes its rough surface exposed to air, affording the largest possible difference in index of refraction between the material of the diffuser and the surrounding medium and, consequently, the largest angular spread for incident light and very efficient diffusion.

Surface features comprising a surface microstructure are preferred. A surface microstructure is easily altered in design of the surface structures and altered in with heat and/or pressure to achieve a macro light shaping efficiency variation before the film is oriented. Microstructures can be tuned for different light shaping and spreading efficiencies and how much they spread light. Examples of microstructures are a simple or complex lenses, prisms, pyramids, and cubes. The shape, geometry, and size of the microstructures can be changed to accomplish the desired light shaping. The light shaping elements can form a brightness enhancement article that features a flexible, transparent base layer and two distinct surfaces, each having a topography designed to act in concert to perform the function of controlling the exit angles of light emitted from a back-lit display. The article may take several forms. The brightness enhancement film, or BEF, can be a linear array of prisms with pointed, blunted, or rounded tops. The BEF's primary job is to increase the on-axis brightness from a backlight in a LCD. It achieves this by recycling light entering the film at very shallow angles to the film (this light would be otherwise wasted as it passes through the liquid crystal). The BEF can also be made up of individual optical elements that can be, for example, sections of a sphere, prisms, pyramids, and cubes. The optical elements can be random or ordered, and independent or overlapping. The sides can be sloped, curved, or straight or any combination of the three. The light shaping elements can also be retroreflective structures, typically used for road and construction signs or a Fresnel lens designed to collimate light. Having surface structures filled with nanoparticles can change the index of refraction of the surface structures to enhance their performance. For example, having a higher index of refraction Fresnel lens will help the lens collimate light more efficiently making an overhead projector brighter. The surface features may be stretched post formation to alter the shape of the surface features. When stretched, the nanoparticles will typically not create voids because the particles are small. Stretching after casting the thermoplastic is preferred because it can orient the polymer increasing strength and modulus of the film. Furthermore, orienting the surface features can change the surface feature geometry to added utility.

Stretching the cast film is also desirable to gain optical properties from the resultant stretching of the surface features. For example, when a linear array is stretched along the axis of the linear array, the array becomes flatter and elongated. If the array is stretched constrained in the unstretched direction, the width of the array does not change significantly, but if stretched unconstrained the film necks in and the array becomes narrower. Reverse engineering is used to determine the geometry of the surface features needed to impress upon the film during casting to get the desired shape of the surface features after stretching. The film may be stretched in the transverse and/or the machine direction sequentially or simultaneously. It is advantageous to create surface features and then stretch the film, because once the film is stretched, many polymers orient (for example PET, PEN) and the amount of heat and pressure needed to emboss the stretched film is significantly more.

In another embodiment of the invention, the surface features comprise a binder and a light shaping agent dispersed in the binder. The light shaping elements are preferably polymeric beads. The polymeric beads are typically found in a polymer binder and the size, distribution, and density control the amount of the light shaping. Beads can be spherical or aspherical. How thick a polymer the beads are coated in can alter the amount of light shaping. Using these light shaping elements and binder, the amount of light shaping and how dark the projected area (when used with a diffusion film and a projection system) through projection film on the screen can be easily tailored. Beads in a binder can also tailor light diffusion characteristics in a backlit display, for example an LCD. The polymeric beads, the binder, or both may contain the nanoparticles.

As the resin of the binder or polymeric beads, thermosetting resins such as thermosetting urethane resins consisting of acrylic polyol and isocyanate prepolymer, phenol resins, epoxy resins, unsaturated polyester resins or the like, and thermoplastic resins such as polycarbonates, thermoplastic acrylic resins, or ethylene vinyl acetate copolymer resins may be included.

As the light shaping element contained in the light shaping layer, synthetic resin beads such as polymethyl methacrylate (PMMA) beads, silicone beads, or styrene beads can be used alone or in any combination thereof.

The particle size of the bead, which is determined properly relative to the thickness of the binder, may be an average particle size of 1 to 30 micrometers and preferably has a narrow distribution. The polymeric bead, when used for diffusion, increases the light diffusibility by at least the part of the particles thereof protruding from the surface of the light shaping elements. The average particle size should be in such a range that part of the particles can protrude from the surface of the light shaping elements.

In another preferred embodiment of the invention, the surface feature comprises curved surfaces, either singly or in a linear array. Curved surfaces are known to focus and change the direction of transmitted light. The addition of the nanoparticles to curved surfaces increases the hardness of the curved surfaces and provides increased light diffusing or collimating.

Another embodiment of the invention is surface features having a pattern of posts protruding from the surface that can trap liquid around the base of the post where the post and the flat sheet surface intersect. Pits are also preferred because of their optical characteristics and that they can be filled with other materials. The pits and pillars have optical utility as well as abrasion resistance, and smear resistance for further coats on the optical element.

Preferably, the surface features on the optical element are discrete individual optical elements of well defined shape for refracting the incident light distribution such that the distribution of light exiting the films is in a direction more normal to the surface of the films. These individual optical elements may be formed by depressions in or projections on the exit surface of the films, and include one or more sloping surfaces for refracting the incident light toward a direction normal to the exit surface. These sloping surfaces may for example include a combination of planar and curved surfaces that redirect the light within a desired viewing angle. Also, the curvature of the surfaces, or the ratio of the curved area to the planar area of the individual optical elements as well as the perimeter shapes of the curved and planar surfaces may be varied to tailor the light output distribution of the films, to customize the viewing angle of the display device used in conjunction with the films. In addition, the curvature of the surfaces, or the ratio of the curved area to the planar area of the individual optical elements may be varied to redirect more or less light that is traveling in a plane that would be parallel to the grooves of a prismatic or lenticular grooved film. Also the size and population of the individual optical elements, as well as the curvature of the surfaces of the individual optical elements may be chosen to produce a more or less diffuse output or to randomize the input light distribution from the light source to produce a softer more diffuse light output distribution while maintaining the output distribution within a specified angular region about the direction normal to the films.

The surface features (example individual optical elements) on the exit surface of the films are preferably randomized in such a way as to eliminate any interference with the pixel spacing of a liquid crystal display. This randomization can include the size, shape, position, depth, orientation, angle or density of the optical elements. This eliminates the need for diffuser layers to defeat moiré and similar effects. Also, at least some of the individual optical elements may be arranged in groupings across the exit surface of the films, with at least some of the optical elements in each of the groupings having a different size or shape characteristic that collectively produce an average size or shape characteristic for each of the groupings that varies across the films to obtain average characteristic values beyond machining tolerances for any single optical element and to defeat moiré and interference effects with the pixel spacing of a liquid crystal display. In addition, at least some of the individual optical elements may be oriented at different angles relative to each other for customizing the ability of the films to reorient/redirect light along two different axes.

The angles that the light redirecting surfaces of the individual optical elements make with the light exit surface of the films may also be varied across the display area of a liquid crystal display to tailor the light redirecting function of the films to a light input distribution that is non-uniform across the surface of the light source.

The individual optical elements of the light redirecting films also desirably overlap each other, in a staggered, interlocked and/or intersecting configuration, creating an optical structure with excellent surface area coverage. Moreover, the individual optical elements may be arranged in groupings with some of the individual optical elements oriented along one axis and other individual optical elements oriented along another axis. Also, the orientation of the individual optical elements in each grouping may vary. Further, the size, shape, position and/or orientation of the individual optical elements of the light redirecting films may vary to account for variations in the distribution of light emitted by a light source.

The properties and pattern of the optical elements of light redirecting films may also be customized to optimize the light redirecting films for different types of light sources which emit different light distributions, for example, one pattern for single bulb laptops, another pattern for double bulb flat panel displays, and so on.

Further, light redirecting film systems are provided in which the orientation, size, position and/or shape of the individual optical elements of the light redirecting films are tailored to the light output distribution of a backlight or other light source to reorient or redirect more of the incident light from the backlight within a desired viewing angle. Also, the backlight may include individual optical deformities that collimate light along one axis and the light redirecting films may include individual optical elements that collimate light along another axis perpendicular to the one axis.

For all of the individual optical elements, nanoparticles can increase the index of refraction of the individual optical elements and increase the performance of the elements, while not significantly effecting the light transmission or refraction of the optical element. The transparency of polymer/nanoparticle blend is dependent upon, in part, the sizes and refractive indexes of the nanoparticles contained therein. If the nanoparticles have large mean diameters, the transparency of the polymer/nanoparticle blend may be diminished. Light directed at the blend containing large particles would be reflected back to the light source or deflected to the side, reducing the apparent transparency of the blend. Moreover, the transparency of the blend may be diminished upon the addition of very small nanoparticles, if the particles agglomerate within the polymer. These particle agglomerates act as larger particles that may scatter or reflect light. For a transparent blend, the primary nanoparticles must be highly dispersed (non-agglomerated) in the polymer to avoid light scattering.

Preferably the surface features comprise a polymer. Polymers are easily processed, generally inexpensive, and can be manufactured roll to roll, tear resistant, and have excellent conformability, good chemical resistance and high in strength. Polymers are preferred, as they are strong and flexible. Thermoplastic polymers are preferred as they are generally lower in cost compared to glass surface features, have excellent optical properties and can be efficiently formed into lenses utilizing known processes such as melt extrusion, vacuum forming and injection molding. Preferred polymers for the formation of the complex lenses include polyolefins, polyesters, polyamides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, and polyolefin ionomers. Copolymers and/or mixtures of these polymers to improve mechanical or optical properties can be used. Preferred polyamides for the transparent complex lenses include nylon 6, nylon 66, and mixtures thereof. Copolymers of polyamides are also suitable continuous phase polymers. An example of a useful polycarbonate is bisphenol-A polycarbonate. Cellulosic esters suitable for use as the continuous phase polymer of the complex lenses include cellulose nitrate, cellulose triacetate, cellulose diacetate, cellulose acetate propionate, cellulose acetate butyrate, and mixtures or copolymers thereof. Preferably, polyvinyl resins include polyvinyl chloride, poly (vinyl acetal), and mixtures thereof. Copolymers of vinyl resins can also be utilized. Preferred polyesters of the invention include those produced from aromatic, aliphatic or cycloaliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoisophthalic and mixtures thereof. Examples of suitable glycols include ethylene glycol, propylene glycol, butanediol, pentanediol, hexanediol, 1,4-cyclohexanedimethanol, diethylene glycol, other polyethylene glycols and mixtures thereof.

The minute particles preferably comprise inorganic oxides, and more preferably metal oxides. Inorganic oxide particles of the present invention are desirably substantially spherical in shape, relatively uniform in size (have a substantially monodisperse size distribution) or a polymodal distribution obtained by blending two or more substantially monodisperse distributions. It is further preferred that the inorganic oxide particles be and remain substantially non-aggregated (substantially discrete), as aggregation can result in large particles that scatter light, reducing optical clarity.

A wide range of colloidal inorganic oxide particles can be used in the optical element of the present invention. Representative examples include silica, titania, alumina, zirconia, vanadia, chromia, iron oxide, magnesium oxide, antimony oxide, zinc oxide, tin oxide, titanates (Calcium or Barium) and mixtures thereof. The inorganic oxide particles can comprise essentially a single oxide such as silica, a combination of oxides, such as silica and aluminum oxide, or a core of an oxide of one type (or a core of a material other than a metal oxide) on which is deposited an oxide of another type.

Metal oxides are preferred because of the availability of commercially available nanoparticle sized metal oxides and their typically high refractive indexes. In addition, a number of the metal oxides are white powders that can allow for improved transparency in the visible range at higher wt % loadings.

The minute particles are preferably a metal sulfide. Metal sulfides are preferred because they have high indexes of refraction and are easily processable. PbS, ZnS, CdS are representative metal sulfides of interest. Metal sulfides are also of interest because they have electronic band gaps that are a function of their diameter. Correct selection of these diameters/band gaps may be utilized to collect light via absorption from UV wavelengths from the backlight and re-emit the light in useful, visible wavelengths thereby improving intensity etc. Further, these materials are stable and do not easily photobleach as do some organic based fluorescent materials. Additionally, some metal oxides can be selected to absorb UV wavelength light for the same advantage as the metal sulfides. The nanoparticles may be chosen to efficiently adsorb dyes of interest. With the ultrahigh surface area due to ultrafine particle mean size, adsorption can be efficiently carried out with the nanoparticles acting as a dye receiving layer.

The nanoparticles may be added in various combinations to achieve different colors in the surface optical element. The nanoparticles of metal oxides or sulfides can give intense coloring when the size is sufficiently small and the particle size distribution is sharp. Also, varying particle sizes of one nanoparticle may produce different coloring when the size is sufficiently small.

These nanoparticles may have various morphologies including spherical, rods, cubes, plates, irregular or other basic geometrical shapes. Appropriate selection of morphology may aid in the dispersion and light management within the surface optical elements. The particle size distribution is preferably tight i.e. the particle diameter extremes on the low and the high side of the mean being to within $\pm/-25\%$ and more preferably $\pm/-10\%$. A sharp (tight) particle size distribution aids in processing but also in light management properties especially in materials with non-spherical morphologies that are able to align in structures with such alignment being aided by tight particle size distributions.

The optimal loadings of the nanoparticles into the polymer matrix will depend on the polymer-nanoparticle system chosen. Dependent on the nanoparticle chosen with its respective refractive index and the polymer matrix with its refractive index, in order to achieve a refractive index difference acceptable for the desired effect, the loadings may need to go as high as 75 wt %. Preferably, less than 50 wt % loadings are desirable due to ease of processing and resultant optical and mechanical properties of the polymer-nanoparticle composite being more favorable.

Preferably, the minute particles comprise surface functionality. This surface functionality can help compatibility between the particles and the polymer so that the particles do not have as much of a tendency to aggregate. One surface treatment for functionality comprises a curable silane component having at least one hydrolyzable silane moiety and at least one curable moiety other than a silane moiety. Charging the surfaces of the particles or coating the surfaces of the particles may also create the surface functionality.

Preferably, the optical element further comprises a surfactant or dispersant. The surfactant/dispersant can aid in the processing of the nanoparticles so that agglomeration is minimized. Correct selection of, for example, an anionic, cationic, neutral, or amphoteric stabilizer may also favorably increase the polymer-particle interactions thereby improving the dispersion and ease of dispersing within the polymer matrix. Preferred wt % loadings of the surfactant/dispersant are 0.1–100 wt % by weight of the nanoparticle and more preferably 0.1–10 wt %.

Where colloidal inorganic oxide nano-particles and nano-clay are both nano-particles as defined above, they have different properties. Colloidal inorganic oxide nano-particles typically have very high indexes of refraction and therefore are used to increase the index of refraction of polymeric surface features. This increases the efficiency of certain surface features such as those designed for collimating light. Nanoclays, on the other hand, when in use, typically have lower indexes of refraction than most polymers and are used to lower the index of refraction of surface features. This may be used to reduce the reflections off the surface features. Nanoclays must be dispersed and intercalated or exfoliated to get to the nanoclay and typically have one dimension in the less than 100 nanometer range, forming plate-like structures. Colloidal inorganic oxide nano-particles must be dispersed and typically have similar dimensions in all three dimension. Some of these particles could be classified as having irregular spherical shapes and usually have all 3 dimensions less than 100 nanometers. Both colloidal inorganic oxide nano-particles and nanoclays can change the mechanical and processing properties of the polymer they are in. Colloidal inorganic oxide nano-particles and nanoclays can be used together in the surface features for added utility. It has been shown that the colloidal inorganic oxide nano-particles can actually go in between the intercalated clay layers.

"Nanocomposite" shall mean a composite material wherein at least one component comprises an inorganic phase, such as a smectite clay, with at least one dimension in the 0.1 to 100 nanometer range. "Plates" shall mean particles with two dimensions of the same size scale and is significantly greater than the third dimension. Here, length and width of the particle are of comparable size but orders of magnitude greater than the thickness of the particle.

"Layered material" shall mean an inorganic material such as a smectite clay that is in the form of a plurality of adjacent bound layers. "Platelets" shall mean individual layers of the layered material. "Intercalation" shall mean the insertion of one or more foreign molecules or parts of foreign molecules between platelets of the layered material, usually detected by X-ray diffraction technique, as illustrated in U.S. Pat. No. 5,891,611 (line 10, col. 5–line 23, col. 7).

"Intercalant" shall mean the aforesaid foreign molecule inserted between platelets of the aforesaid layered material. "Exfoliation" or "delamination" shall mean separation of individual platelets in to a disordered structure without any stacking order. "Intercalated" shall refer to layered material that has at least partially undergone intercalation and/or exfoliation. "Organoclay" shall mean clay material modified by organic molecules.

The surface features preferably contain nanoclay. The minute layered particulate materials, also known as nanoclay, useful in the invention have a layer thickness dimension in the range of from 0.1 to 100 nanometers and typically from 0.5 to 10 nanometers. The average basal plane separation is desirably in the range of from 0.5 to 10 nanometers, preferably in the range of from 1 to 9 nanometers, and typically in the range of from 2 to 5 nanometers. The nanoclay can alter the physical properties of the surface features as well as the optical features. Nanoclays are very efficient diffusers and be tailored to a wide range of light transmission and haze values by changing concentrations and chemistries.

The layered materials suitable for this invention can comprise any inorganic phase desirably comprising layered materials in the shape of plates with significantly high aspect ratio. However, other shapes with high aspect ratio will also be advantageous, as per the invention. The layered materials suitable for this invention include phyllosilicates, e.g., montmorillonite, particularly sodium montmorillonite, magnesium montmorillonite, and/or calcium montmorillonite, nontronite, beidellite, volkonskoite, hectorite, saponite, sauconite, sobockite, stevensite, svinfordite, vermiculite, magadiite, kenyaite, talc, mica, kaolinite, and mixtures thereof. Other useful layered materials include illite, mixed layered illite/smectite minerals, such as ledikite and admixtures of illites with the clay minerals named above. Other useful layered materials, particularly useful with anionic polymers, are the layered double hydroxides or hydrotalcites, such as $Mg_6Al_{3.4}(OH)_{18.8}(CO_3)_{1.7}H_2O$, which have positively charged layers and exchangeable anions in the interlayer spaces. Other layered materials having little or no charge on the layers may be useful provided they can be intercalated with swelling agents, which expand their interlayer spacing. Such materials include chlorides such as $FeCl_3$, FeOCl, chalcogenides, such as $TiS_2$, $MoS_2$, and $MoS_3$, cyanides such as $Ni(CN)_2$ and oxides such as $H_2Si_2O_5$, $V_6O_{13}$, $HTiNbO_5$, $Cr_{0.5}V_{0.5}S_2$, $V_2O_5$, Ag doped $V_2O_5$, $W_{0.2}V_{2.8}O7$, $Cr_3O_8$, $MoO_3(OH)_2$, $VOPO_4\text{-}2H_2O$, $CaPO_4CH_3\text{—}H_2O$, $MnHAsO_4\text{—}H_2O$, and $Ag_6Mo_{10}O_{33}$. Preferred layered materials are swellable so that other agents, usually organic ions or molecules, can intercalate and/or exfoliate the layered material resulting in a desirable dispersion of the inorganic phase. These swellable layered materials include phyllosilicates of the 2:1 type, as defined in clay literature (vide, for example, "An introduction to clay colloid chemistry," by H. van Olphen, John Wiley & Sons Publishers). Typical phyllosilicates with ion exchange capacity of 50 to 300 milliequivalents per 100 grams are preferred. Preferred layered materials for the present invention include smectite clay such as montmorillonite, nontronite, beidellite, volkonskoite, hectorite, saponite, sauconite, sobockite, stevensite, svinfordite, halloysite, magadiite, kenyaite and vermiculite as well as layered double hydroxides or hydrotalcites. Most preferred smectite clays include montmorillonite, hectorite and hydrotalcites, because of commercial availability of these materials.

The concentration of particles in the optical component of the invention can vary as per need; however, it is preferred to be <10% by weight of the binder. Significantly higher amounts of clay can impair physical properties of the optical component by rendering it brittle, as well as difficult to process. On the other hand, too low a concentration of clay may fail to achieve the desired optical effect. It is preferred that the clay concentration be maintained between 1 and 10% and more preferred to be between 1.5 and 5% for optimum results.

The optical element preferably has a haze greater than 70%. A haze value greater than 70% provides efficient light diffusion and has been shown to significantly reduce unwanted optical patterns caused by ordered surface features such as linear prisms. The optical element with a haze value of 70% can diffuse a backlight source, while still having high light transmission.

It is preferred that the optical element has a gain of at least 1.2 when illumined by a backlight in an LCD display. Gain is defined as the light output at the normal to the display with the light directing polymeric film divided by the light output at the normal to the display without the light directing polymeric film. Having a gain of at least 1.2 creates a display that can be brighter or that can use less battery power. More preferred is a gain of 1.5. Pyramidal structures, linear array of pyramids, and many other surface feature geometries can create gain in a display by collimating light entering the optical element.

Preferably, the surface features have a percent transmission and reflection greater than 105. This accomplished by directing the light in such a manner as to transmit incoming light from one direction with minimal loss of said light and with minimal redirection of said light, while at the same time reflecting the light from the opposite direction with minimal loss. One embodiment would look like a linear array of pyramids where the pyramids have a high aspect ratio and the spaces between the pyramids are filled in with a reflective, different index of refraction material. This optical element serves as a transflector, an element that can be used in a display device that is used in both transmission and reflection mode.

The minute particles preferably have an index of refraction greater than 2.0. When minute particles with an index of refraction of greater than 2.0 are added to a polymer matrix (typically with a 1.4–1.6 index of refraction), the index of refraction of the well dispersed polymer matrix increases. Many optical features, such as diffusers and collimating films rely on the difference between the polymer surface feature and air indexes of refraction to work and therefore work more efficiently when the index of refraction of the polymer matrix is increased. Nanoparticles are advantaged to increase index of refraction because they can influence index of refraction without significantly changing the scattering properties of the optical element. Preferably, the index of refraction of the optical element changes by at least 0.02 from the base polymer. This increase in refraction increases performance of the optical element and even a 0.02 increase in index of refraction yields optical benefits. More preferred, the index of refraction of the optical element changes by at least 0.1 from the base polymer. It has been shown that in some collimating films a 0.1 index of refraction increase, increases gain by 4% which allows for longer life of batteries in displays.

Preferably, the substrate is a polymer with a light transmission of at least 85%. An 85% light transmission value allows backlit devices to improve battery life and increase screen brightness. The most preferred light transmission of the substrate is greater than 92%. A light transmission of 92% allows for transmission of the back light and maximizes the brightness of a liquid crystal device significant improving the image quality of a backlit device for outdoor use where the display must compete with natural sunlight.

The substrate is preferably, a voided polymer. Microvoided substrates are preferred because the voids provide opacity without the use of $TiO_2$. They also provide cushioning during a printing process. Microvoided composite oriented sheets are conveniently manufactured by coextrusion of the core and surface layers, followed by biaxial orientation, whereby voids are formed around void-initiating material contained in the core layer. The voided polymer substrate can diffuse light in transmission or reflection. Such composite sheets are disclosed in, for example, U.S. Pat. Nos. 4,377,616; 4,758,462; and 4,632,869. The voided polymer substrate can be voided using void initiating particles or can be foamed.

Preferably, the surface features are on both sides of the optical element. By having surface features on more than one side, more light shaping can be accomplished because the light will pass through two interfaces with surface features. For example, the surface facing the light source may have a diffuser texture such as a complex lens structure on it to diffuse the light and the side away from the light source might have features that serve to collimate the light such as prismatic arrays or pyramidal shapes. In one embodiment, the surface features on both sides are aligned. The surface features structures on either side can vary, for example, in curvature, depth, size, spacing, and geometry, and aspect ratio.

Preferably, the substrate contains a dispersion of minute particles having a particle size dimension less than 100 nanometers. The nanoparticles can change the index of refraction of the substrate without significantly affecting the scattering the substrate. Furthermore, the addition of nanoparticles to the substrate can increase printability and enhance the mechanical features of the substrate, such as hardness and glass transition temperature. In addition, when nanoparticles are added to the substrate, the substrate can be tailored to the index of refraction of the surface features so that there are no Fresnel loses at the interface between the substrate and the surface features.

The substrate preferably diffracts light. The substrate may be holographic or contain multiple thin layers. This can add holographic images to the optical element for an interesting look. It can also cause a mirror effect by diffracting most of the visible light. The optical element with a holographic substrate could be used in an LC display in a watch or clock and could be customized. The substrate may also contain a bland of immiscible polymers.

The surface features are preferably dimensionally modified by at least 5% using heat. The surface features can also be altered using a combination of heat and pressure or just pressure. The process consists of using heat and/or pressure in a gradient or pattern to alter the shape of the surface features. When heat and/or pressure is applied to the feature partially or fully melts, flows, and cools to form a new structure where some or all of the feature is flattened. Heat and/or pressure is a way to selectively turn off the optical properties on the film and can be applied in a very precise way to create dots, lines, patterns, and text in the light directing film. This can be employed to tailor the amount of diffuse and specular transmission to the backlight output of a liquid crystal device.

Preferably, a resistive thermal head or laser thermal system applies the heat and/or pressure. The resistive thermal head, such as a print head found in a thermal printer, uses heat and pressure to melt the surface features. This process is preferred because it has accurate resolution, can add color at the same time as melting the surface features, and uses heats and pressures to melt a range of polymers. Preferably, color is added to the modified areas. The color added is preferably a dye because dyes are transparent so the colored areas show up bright and colored. Furthermore, dyes are easily added at the same time the specular areas are created using dyes that sublimate and a thermal printer. This is advantaged because there are no registration issues between the areas of color (with dye) and the areas of modifies surface features because they are created at the same time using a printing technique that is inexpensive and already supported by the printing industry.

The light shaping elements preferably comprise nanopigment less than 100 nanometers in diameter. Nano-sized pigments have the advantage that less of the pigment is needed to achieve the same color saturation than micrometer or larger sized pigment particles because the pigment particles are so small they are more efficient at adding color. Furthermore, because all of the pigments are concentrated in the surface features, less pigment is needed to have the same coloration compared to a nanopigment throughout the optical element because the pigment is more efficient when concentrated in a thin layer (the surface features). Because the pigments are below the wavelength of light, nanopigments tend not to scatter light as much as larger pigments. It is preferred to have the substrate contain nanopigments less than 100 nanometers in size because the pigments would be more evenly distributed over the entire width of the film, whereas a coloration variation might occur if the surface features were large and contained nanopigment. Any other colorant such as dyes could also be used in the substrate or surface features.

The optical element preferably has a pressure sensitive adhesive. The pressure sensitive adhesive can be permanent or repositionable. The pressure sensitive adhesive is used to adhere the film onto an object, such as an ID badge, display component or other film. The adhesive preferably is coated or applied to the substrate. A preferred pressure sensitive adhesive is an acrylic-based adhesive. Acrylic adhesives have been shown to provide an excellent bond between plastics. The preferred adhesive materials may be applied using a variety of methods known in the art to produce thin, consistent adhesive coatings. Examples include gravure coating, rod coating, reverse roll coating and hopper coating. In display media, pressure sensitive adhesives are used to adhere optical films to a waveguide, polarizer, or other films. This reduces the chance that the optical film with slip around the device or bow causing optical defects. It also makes assembly by the display manufacturers simpler.

A preferred liner material or peelable back is an oriented sheet of polymer. The liner preferably is an oriented polymer because of the strength and toughness developed in the orientation process and the low amount of dust and lint that could be introduced if a paper liner is used. Preferred polymers for the liner substrate include polyolefins, polyester and nylon. Preferred polyolefin polymers include polypropylene, polyethylene, polymethylpentene, polystyrene, polybutylene, and mixtures thereof. Polyolefin copolymers, including copolymers of propylene and ethylene such as hexene, butene, and octene are also useful. Polyester is most preferred, as it has desirable strength and toughness properties required for efficient transport of labels or optical films liner in high speed labeling equipment.

Additional skin layers preferably are added to the optical element to achieve added utility. Preferably, the skin layer contains a dispersion of minute particles having a particle size dimension less than 100 nanometers. The nanoparticles can change the index of refraction of the skin layer without significantly affecting the scattering the substrate. Furthermore, the addition of nanoparticles to the substrate can increase printability and enhance the mechanical features of the whole optical element, such as hardness, glass transition temperature, and processability. Smaller amounts of minute particles many be needed to obtain the same physical or optical properties when in a skin layer versus the substrate because the minute particles perform more efficiently in a concentrated skin layer.

Preferably, the optical element comprises additional layers where the additional layers and surface features vary by at least 0.05 in index of refraction. This can create a reflective polarizer, if one of the indexes of refraction in the plane of the element is the same for the layers, and the index of refraction perpendicular to the first index is different by more than 0.05. The addition layers could also form an antireflective element, or enhance the optical performance of the optical element.

Skin layers may also contain tints, antistatic materials, or different void-making materials to produce sheets of unique properties. The optical element could be formed with surface layers that would provide an improved adhesion. Addenda of this invention could be an optical brightener. An optical brightener is substantially colorless, fluorescent, organic compound that absorbs ultraviolet light and emits it as visible blue light. Examples include but are not limited to derivatives of 4,4'-diaminostilbene-2,2'-disulfonic acid, coumarin derivatives such as 4-methyl-7-diethylaminocoumarin, 1-4-Bis(O-Cyanostyryl)Benzol and 2-Amino-4-Methyl Phenol. Optical brightener can be used in a skin layer leading to more efficient use of the optical brightener.

The optical element may be coated or treated after the co-extrusion and orienting process or between casting and full orientation with any number of coatings which may be used to improve the properties of the sheets including printability, to provide a vapor barrier, to make them heat sealable, or to improve adhesion. Examples of this would be acrylic coatings for printability, coating polyvinylidene chloride for heat seal properties. Further examples include flame, plasma or corona discharge treatment to improve printability or adhesion.

The optical element of the present invention may be used in combination with a film or sheet made of a transparent polymer. Examples of such polymer are polyesters such as polycarbonate, polyethylene terephthalate, polybutylene terephthalate and polyethylene naphthalate, acrylic polymers such as polymethyl methacrylate, and polyethylene, polypropylene, polystyrene, polyvinyl chloride, polyether sulfone, polysulfone, polyarylate and triacetyl cellulose. The projection media may be mounted to a glass sheet for support. The optical element of the invention can also include, in another aspect, one or more optical coatings to improve optical transmission through the film. It is often desirable to coat a layer of an anti-reflective (AR) coating in order to raise the efficiency of the light management film.

The optical element of the present invention may be incorporated with e.g. an additive or a lubricant such as silica for improving the drawability and the surface-slipperiness of the film within a range not to deteriorate the optical characteristics to vary the light-scattering or shaping property with an incident angle. Examples of such additive are organic solvents such as xylene, alcohols or ketones, fine particles of an acrylic resin, silicone resin or Δ metal oxide or a filler.

The optical element of the invention may also be used in conjunction with a light diffuser, for example a bulk diffuser, a lenticular layer, a beaded layer, a surface diffuser, a holographic diffuser, a micro-structured diffuser, another lens array, or various combinations thereof. The optical element may also be used in an application with more than one sheet of the light management film stacked, or with any other optical film including brightness enhancement films, retroreflective films, waveguides, and diffusers.

In a preferred embodiment of the invention, the surface features are ordered. By providing an ordered surface features, light directing and light guiding can be achieved by the optical element of the invention. In another preferred embodiment of the invention, the surface features are random. By providing a random surface features, light diffusion can be achieved by the optical element of the invention. Further, a random surface features has been shown to reduce unwanted optical patterns such as Moire that might result from an ordered surface features.

In preferred embodiment, the surface feature of the invention comprises a prism. Prism structures are well known and efficiently increase the brightness of the transmitted light by rejecting light energy that is obliquely incident to the surface. In another preferred embodiment, the surface feature of the invention comprises a corner cube. Corner cube surface features are well known and reduce glare of unwanted ambient light.

In another embodiment of the invention the optical element contains an optical spacer to provide a air gap, specified focal length and scratch and impact resistance. An optical element containing a rough surface having a roughness average equal to at least 5 micrometers wherein the rough surface contains at least two roughness populations in which the at least two populations vary by at least 8 micrometers is preferred. The optical element with two roughness populations provides at least one functional optical surface such as a light diffuser or light guide and another population that provides spacing in an optical system consisting of more than one optical component. By providing at least one roughness population that is higher than the others, the higher population provides the optical contact with other optical components while the other roughness population provides the optical utility such as light direction or light diffusion. Further, the two populations preferably vary by at least 8 micrometers because spacing less than 5 micrometers can result in unwanted light interference patterns.

Precision control of the air gap between the optical element of the invention and other optical components can greatly improve the efficiency and the variability of the optical element in an optical system. An example is visible light diffusion films containing an integral optical spacer. By providing an optical spacer between a surface diffuser and other optical components, the spread of the diffused light into other optical components can be specified and controlled by the height of the optical spacer compared to the light diffusing element. A specular light source, such as a laser, can be surface diffused into a narrow cone without the use of a spacer and can be surfaced diffused into a broad cone using a spacer that is 5 to 20 times larger than the diffusion element. A narrow light diffusion cone will tend to provide narrow viewing angle in an LC device while a broad cone will provide a larger viewing angle. Both narrow cone diffusers and broad cone diffusers have utility depending on the light diffusion application.

The optical element of the invention preferably comprises a geometrical spacer. A geometrical spacer, greater in height that the functional optical element, provides a precise air gap when used in combination with other optical components such as brightness enhancement films and polarizing films. A geometrical shape provides mechanical and optical utility for both reflected and transmitted light energy. In a preferred embodiment of the invention, the geometric spacer useful in the invention comprises a cylinder. A cylinder provides for specular light transmission and is impact resistant. Further, the end of the cylinder provides excellent contact points when the optical element of the invention is used in combination with other optical components.

A surface feature with an elastic modulus greater than 500 MPa is preferred. An elastic modulus greater than 500 MPa allows for the surface feature to be laminated with a pressure sensitive adhesive for combination with other optical webs materials. Further, because the surface feature is mechanically tough, the light diffuser is better able to with stand the rigors of the assembly process compared to prior art cast diffusion films, which are delicate and difficult to assemble.

The light shaping elements preferably comprise an UV fluorescing agent. The fluorescing agent takes the light the UV and emits light in the visible region. This is one way to increase brightness in a backlit display, instead of absorbing the UV light from the backlight source, the fluorescing agent converts the UV light into visible light. It also gives the light management film an interesting look by having a film that glows under UV lighting or has a decay such that the fluorescing agents continue to fluoresce after exposure to UV light making it glow in the dark.

Preferably, the surface features can receive a dye density of at least 0.5. This enables the surface features to be printed on directly to create light management films with a surface texture and coloration. The light shaping elements may receive dye density without changing shape, or can partially or fully collapse to create areas of specular reflection or transmission. Preferably, the layer capable of receiving dye can receive dye densities of at least 1.5. It has been shown that a DRL that can receive a dye density of at least 1.5 can replicate a large portion of the Pantone® color space and create true and saturated colors. A DRL is preferred so that the coloration is transferred is efficiently and mordant into optical element. The DRL must be compatible with the colorant that it will be imaged so as to yield the desirable color gamut and density. The DRL can be, for example, a thermal dye receiving layer, an inkjet receiving layer, a toner receiving layer, etc.

Polycarbonates (the term "polycarbonate" as used herein means a carbonic acid and a diol or diphenol) and polyesters have been suggested for use in image-receiving layers for thermal printing. Polycarbonates (such as those disclosed in U.S. Pat. Nos. 4,740,497 and 4,927,803) have been found to possess good dye uptake properties and desirable low fade properties when used for thermal dye transfer. As set forth in U.S. Pat. No. 4,695,286, bisphenol-A polycarbonates of number average molecular weights of at least about 25,000 have been found to be especially desirable in that they also minimize surface deformation which may occur during thermal printing.

Polyesters, on the other hand, can be readily synthesized and processed by melt condensation using no solvents and relatively innocuous chemical starting materials. Polyesters formed from aromatic diesters (such as disclosed in U.S. Pat. No. 4,897,377) generally have good dye up-take properties when used for thermal dye transfer. Polyesters formed from alicyclic diesters disclosed in U.S. Pat. No. 5,387,571 (Daly) and polyester and polycarbonate blends disclosed in U.S. Pat. No. 5,302,574 (Lawrence et al.), the disclosure of which is incorporated by reference.

Polymers may be blended for use in the dye-receiving layer in order to obtain the advantages of the individual polymers and optimize the combined effects. For example, relatively inexpensive unmodified bisphenol-A polycarbonates of the type described in U.S. Pat. No. 4,695,286 may be blended with the modified polycarbonates of the type described in U.S. Pat. No. 4,927,803 in order to obtain a receiving layer of intermediate cost having both improved resistance to surface deformation which may occur during thermal printing and to light fading which may occur after printing. A problem with such polymer blends, however, results if the polymers are not completely miscible with each other, as such blends may exhibit a certain amount of haze. While haze is generally undesirable, it is especially detrimental for transparency receivers. Blends which are not completely compatible may also result in variable dye uptake, poorer image stability, and variable sticking to dye donors.

In a preferred embodiment of the invention, the alicyclic rings of the dicarboxylic acid derived units and diol derived units contain from 4 to 10 ring carbon atoms. In a particularly preferred embodiment, the alicyclic rings contain 6 ring carbon atoms.

A dye-receiving element for thermal dye transfer comprising a miscible blend of an unmodified bisphenol-A polycarbonate having a number molecular weight of at least about 25,000 and a polyester comprising recurring dibasic acid derived units and diol derived units, at least 50 mole % of the dibasic acid derived units comprising dicarboxylic acid derived units containing an alicyclic ring within two carbon atoms of each carboxyl group of the corresponding dicarboxylic acid, and at least 30 mole % of the diol derived units containing an aromatic ring not immediately adjacent to each hydroxyl group of the corresponding diol or an alicyclic ring are preferred. This polymer blend has excellent dye uptake and image dye stability, and which is essentially free from haze. It provides a receiver having improved fingerprint resistance and retransfer resistance, and can be effectively printed in a thermal printer with significantly reduced thermal head pressures and printing line times. Surprisingly, these alicyclic polyesters were found to be compatible with high molecular weight polycarbonates.

Examples of unmodified bisphenol-A polycarbonates having a number molecular weight of at least about 25,000 include those disclosed in U.S. Pat. No. 4,695,286. Specific examples include Makrolon 5700 (Bayer AG) and LEXAN 141 (General Electric Co.) polycarbonates.

In a further preferred embodiment of the invention, the unmodified bisphenol-A polycarbonate and the polyester polymers are blended at a weight ratio to produce the desired Tg of the final blend and to minimize cost. Conveniently, the polycarbonate and polyester polymers may be blended at a weight ratio of from about 75:25 to 25:75, more preferably from about 60:40 to about 40:60.

Among the necessary features of the polyesters for the blends of the invention is that they do not contain an aromatic diester such as terephthalate, and that they be compatible with the polycarbonate at the composition mixtures of interest. The polyester preferably has a Tg of from about 40° C. to about 100° C., and the polycarbonate a Tg of from about 100° C. to about 200° C. The polyester preferably has a lower Tg than the polycarbonate, and acts as a polymeric plasticizer for the polycarbonate. The Tg of the final polyester/polycarbonate blend is preferably between 40° C. and 100° C. Higher Tg polyester and polycarbonate polymers may be useful with added plasticizer.

Since the optical element of the invention typically is used in a projection or display systems, an optical element with an elastic modulus greater than 500 MPa is preferred. An optical element with an impact resistance greater than 0.6 GPa is preferred. An impact resistance greater than 0.6 GPa allows the optical element to resist scratching and mechanical deformation.

It is preferred to use the process of extrusion polymer coating to create the surface features. It is known to produce polymeric film having a resin coated on one surface thereof with the resin having a surface texture. The polymeric film with the molten resin thereon is brought into contact with a patterned roller having a surface pattern (opposite to the desired pattern on the film). During this process the surface texture on the pattern roller's surface is imprinted into the resin coated polymeric film. Thus, the surface pattern on the pattern roller is critical to the surface produced in the resin for the resulting optical element. The surface of the patterned roller can also be subjected to any process to create the desired pattern on the roll such as diamond cutting, laser ablating, or photolithography to create the inverse pattern of the desired pattern of the surface features.

Similarly, the optical element may be created by co-extrusion. Extrusion and coextrusion techniques are well known in the art and are described, e.g., in Encyclopedia of Polymer Science and Engineering, Vol. 3, John Wiley, New York, 1985, p. 563, and Encyclopedia of Polymer Science and Engineering, Vol. 6, john Wiley, New York, 1986, p. 608, the disclosures of which are incorporated by reference.

Preferably, the surface features are formed using the process of solvent coating. The coating can be applied to one or both substrate surfaces through conventional pre-metered or post-metered solvent coating methods such as blade, air knife, rod, roll coating etc. The choice of coating process would be determined from the economics of the operation and in turn, would determine the formulation specifications such as coating solids, viscosity, and speed. The coating processes can be carried out on a continuously operating machine wherein a single layer or a plurality of layers is applied to the support. Solvent coating is preferred because it is roll to roll and the polymers can be coated with as many as 15 different layers at once.

The optical element of the invention may also be manufactured by vacuum forming around a pattern, injection molding or embossing a polymer web.

The optical element can be transformed into a reflection film or a transflector film by applying a reflection layer composed of a metallic film, etc., to the film of the present invention to be used e.g. as a retroreflective member for a traffic sign. It can be used in a state applied to a car, a bicycle, person, etc. The surface of the optical element can also be partially metallized as to create a transflector, an optical film in a LCD so that the LCD can be used in both reflection and transmission mode. The optical element of the present invention can be used as an electrode by laminating a transparent conductive layer composed of indium oxide represented by ITO film.

Another application for the optical element is a rear projection screen, where it is generally desired to project the image from a light source onto a screen over a large area. The viewing angle for a television is typically smaller in the vertical direction than in the horizontal direction so variable diffusion across the display can control the viewing angle and brightness across the display.

The entire contents of the patents and other publications referred to in this specification are incorporated herein by reference.

EXAMPLES

In this example, modeling will show that when minute particles are added to a polymer surface feature, the optical performance of an optical element that collimates light from a backlight increases.

The film modeled was a substrate with surface features in the form of a linear array of triangular prisms. The entire film was 155 micrometers, with the substrate thickness of 105 micrometers and the prisms with a height of 50 micrometers. The substrate modeled was oriented polyester with an index of refraction of 1.50. The prisms each had a prism angle of 90 degrees and a pitch of 50 micrometers. This film is typically used to collimate the backlight of a liquid crystal display. Its performance is measured in gain (luminance of the film with the backlight on-axis divided by luminance of backlight alone on-axis). The prisms serve to collimate the light coming from the backlight and to reflect back (using total internal reflection) light incident on the film at high angles. When the linear array of prisms has a higher index of refraction, gain is increased leading to a brighter display.

In order to increase the index of refraction of the polymer in the surface features, nanoparticles of a high index of refraction are added to the polymer matrix. Blends of well dispersed rutile $TiO_2$, ZnS, and $Fe_2O_3$ nanoparticles and polycarbonate were modeled to determine effect of the minute particles on the blend. The particles modeled were all well dispersed blend of 10 nanometer particle size (approximately 22% particle size distribution) rutile $TiO_2$, ZnS, and $Fe_2O_3$ in polycarbonate.

The particles could be dispersed using a single or twin screw extruder. The particles could have surface functionality (for example treated to have a surface charge) or dispersant agents to keep the particles from agglomerating. The dispersant must be able to function and not degrade at extrusion temperatures (for example 315 degrees Celcius).

Refractive index of Rutile $TiO_2$=2.62

Refractive index of polycarbonate=1.586

| % wt $TiO_2$ rutile | Volume Fraction $TiO_2$ | Volume Fraction polycarbonate | Refractive Index |
|---|---|---|---|
| 0 | 0.000 | 1.000 | 1.586 |
| 1 | 0.003 | 0.997 | 1.589 |
| 2 | 0.006 | 0.994 | 1.592 |
| 3 | 0.009 | 0.991 | 1.595 |
| 4 | 0.012 | 0.988 | 1.598 |
| 5 | 0.015 | 0.985 | 1.601 |
| 10 | 0.030 | 0.970 | 1.617 |
| 20 | 0.066 | 0.934 | 1.654 |
| 25 | 0.086 | 0.914 | 1.675 |
| 30 | 0.108 | 0.892 | 1.697 |
| 40 | 0.158 | 0.842 | 1.749 |
| 60 | 0.297 | 0.703 | 1.893 |

Refractive index of ZnS=2.37

Refractive index of polycarbonate=1.586

| % wt ZnS | Volume Fraction ZnS | Volume Fraction polycarbonate | Refractive Index |
|---|---|---|---|
| 0 | 0.000 | 1.000 | 1.586 |
| 1 | 0.003 | 0.997 | 1.588 |
| 2 | 0.006 | 0.994 | 1.591 |
| 3 | 0.009 | 0.991 | 1.593 |
| 4 | 0.012 | 0.988 | 1.596 |
| 5 | 0.016 | 0.984 | 1.598 |
| 10 | 0.032 | 0.968 | 1.611 |
| 20 | 0.070 | 0.930 | 1.641 |
| 25 | 0.091 | 0.909 | 1.657 |
| 30 | 0.114 | 0.886 | 1.675 |
| 40 | 0.167 | 0.833 | 1.717 |
| 60 | 0.310 | 0.690 | 1.829 |

Refractive index of $Fe_2O_3$=2.63

Refractive index of polycarbonate=1.586

| % wt $Fe_2O_3$ | Volume Fraction $Fe_2O_3$ | Volume Fraction polycarbonate | Refractive Index |
|---|---|---|---|
| 0 | 0.000 | 1.000 | 1.586 |
| 1 | 0.003 | 0.997 | 1.589 |
| 2 | 0.006 | 0.994 | 1.592 |
| 3 | 0.009 | 0.991 | 1.595 |
| 4 | 0.012 | 0.988 | 1.598 |
| 5 | 0.015 | 0.985 | 1.601 |
| 10 | 0.030 | 0.970 | 1.617 |
| 20 | 0.066 | 0.934 | 1.654 |
| 25 | 0.086 | 0.914 | 1.675 |
| 30 | 0.108 | 0.892 | 1.697 |
| 40 | 0.158 | 0.842 | 1.749 |
| 60 | 0.297 | 0.703 | 1.893 |

A model was created using Light Tools, a commercially available sequential ray trace software package available from Optical Research associates, the linear array described above and using the index of refraction of the above tables for the index of refraction of the surface features. It was found that a 0.1 increase in the index of refraction of the surface structures from 1.59 to 1.69 resulted in a 4.8% increase in gain of the optical film.

To gain a 0.1 increase in index of refraction of the polycarbonate surface features (index of refraction of 1.59) would have to add approximately 28% by weight $TiO_2$ or $Fe_2O_3$ or 35% by weight ZnS. Even adding much smaller quantities of the nanoparticles to the polymer of the surface features would increase the gain of the optical film and provide benefit to the display designer and user.

Because the nanoparticles used can be expensive, having the nano-particle/polymer blend in the surface features instead of the entire bulk of the optical element saves money while delivering the same optical result.

The nanoparticles/thermoplastic polymer blends also have increased mechanical features, such as increased modulus and scratch resistance. The nanoparticles also affect the melting and glass transition temperatures, which can increase the polymer's melt processing conditions. The nanoparticles also increase the printability of the optical element.

While this example was used for increasing the gain of a collimating film and therefore nano-particle of high index of refraction were used, other nanoparticles other than the ones highlighted in the examples could be used and the same principles apply to creating a polymer/nano-particle blend with lower index of refraction for application such as anti-reflection coatings.

The entire contents of the patents and other publications referred to in this specification are incorporated herein by reference.

What is claimed is:

1. An optical element comprising a substrate with thermoplastic surface features on a surface thereof having an Ra of from 3 to 200 micrometers, the surface features containing a dispersion of minute particles having a particle size dimension less than 100 nanometers.

2. The optical element of claim 1 wherein the minute particles have a particle size dimension less than 15 nanometers.

3. The optical element of claim 1 wherein the minute particles have a particle size distribution of less than 25%.

4. The optical element of claim 1 wherein the surface features have an Ra of from 5 to 100 micrometers.

5. The optical element of claim 1 wherein the surface features have an Ra of from 25 to 75 micrometers.

6. The optical element of claim 1 wherein the surface features comprise polymeric beads.

7. The optical element of claim 1 wherein the surface features comprise curved surfaces.

8. The optical element of claim 1 wherein surface features comprise complex lenses.

9. The optical element of claim 1 wherein the surface features comprise pits or posts.

10. The optical element of claim 1 wherein the surface features comprise a linear array of prisms.

11. The optical element of claim 1 wherein the surface features comprise pyramids.

12. The optical element of claim 1 wherein the surface features comprise Fresnel lenses.

13. The optical element of claim 1 wherein the surface features comprise microgrooves.

14. The optical element of claim 1 wherein the minute particles comprise inorganic oxides.

15. The optical element of claim 1 wherein the minute particles comprise metal sulfides.

16. The optical element of claim 1 wherein the minute particles have an index of refraction of at least 2.0.

17. The optical element of claim 1 wherein the minute particles comprise surface functionality.

18. The optical element of claim 1 wherein the surface features comprise nanoclay.

19. The optical element of claim 1 wherein the surface features have a haze of at least 70%.

20. The optical element of claim 1 wherein the surface features have a gain of at least 1.2.

21. The optical element of claim 1 wherein the sum of the transmission of light from the backlight and the reflection from the ambient light is greater than 105%.

22. The optical element of claim 1 wherein the optical element further comprises a surfactant or dispersant.

23. The optical element of claim 1 wherein the index of refraction of the optical element differs by at least 0.02 from the base polymer.

24. The optical element of claim 1 wherein the surface features contain nanopigments less than 100 nanometers in diameter.

25. The optical element of claim 1 wherein the surface features comprise a mixture of polyester and polycarbonate.

26. The optical element of claim 1 wherein the substrate is a polymer with a light transmission of at least 85%.

27. The optical element of claim 1 wherein the non-feature portion of the substrate contains a dispersion of minute particles having a particle size less than 100 nanometers.

28. The optical element of claim 1 wherein the substrate diffracts light.

29. The optical element of claim 1 wherein the substrate contains-nanopigments having a dimension less than 100 nanometers.

30. The optical element of claim 1 comprising a skin layer containing a dispersion of minute particles having a particle size with a dimension less than 100 nanometers.

31. The optical element of claim 1 comprising additional layer with surface features wherein the additional layer and surface features vary by at least 0.05 in index of refraction from the adjacent layers.

32. The optical element of claim 1 that further comprises a pressure sensitive adhesive layer.

33. The optical element of claim 1 wherein the optical features are present as an integral part of the substrate.

34. The optical element of claim 1 wherein the optical features are present as a separate layer from the substrate.

* * * * *